United States Patent [19]
Koneke

[11] Patent Number: 5,964,186
[45] Date of Patent: Oct. 12, 1999

[54] CAT LITTER MIXTURE AND PACKAGING FOR SAME

[76] Inventor: Walter Koneke, 15 Buffin La., Blue Point, N.Y. 11715

[21] Appl. No.: 08/837,206

[22] Filed: Apr. 14, 1997

[51] Int. Cl.$^6$ .................................................. A01K 1/01
[52] U.S. Cl. ........................................ 119/169; 119/171
[58] Field of Search .................................. 119/169, 170, 119/171, 172; 106/154.1

[56] References Cited

U.S. PATENT DOCUMENTS

| | | | |
|---|---|---|---|
| 1,773,141 | 8/1930 | Hodgson | 119/169 X |
| 1,942,287 | 1/1934 | Heitz | 119/169 |
| 3,626,899 | 12/1971 | Spellman | 119/169 |
| 5,005,520 | 4/1991 | Michael | 119/172 |
| 5,085,174 | 2/1992 | Etkin | 119/169 |
| 5,188,064 | 2/1993 | House | 119/172 |
| 5,361,719 | 11/1994 | Kiebke | 119/171 |
| 5,512,090 | 4/1996 | Franke et al. | 106/154.1 |
| 5,526,770 | 6/1996 | Kiebke | 119/171 |

OTHER PUBLICATIONS

Enpac, Wilmington, Delaware 19810, "Envirofill" ® No. 381 p. 03.

*Primary Examiner*—Robert P. Swiatek
*Assistant Examiner*—Elizabeth Shaw
*Attorney, Agent, or Firm*—Hughes Hubbard & Reed LLP

[57] ABSTRACT

The cat litter assembly includes a single cat box with a plurality of layers of a mixture interspersed by layers of sheets of common newsprint. The main bulk of the mixture is composed of non-toxic biodegradable loose fill polymer material such as ENVIROFILL®, a biodegradable polymer product of the Enpac Company of Wilmington, Del. This is a starch based material that uses water as a blowing agent; it is commonly used as a packaging material and may be disposed by rinsing down the sink as it dissolves in water. Also in the mixture is a small amount of talc, a powdered deodorant, preferably baking soda based, and filtered sand.

8 Claims, 4 Drawing Sheets

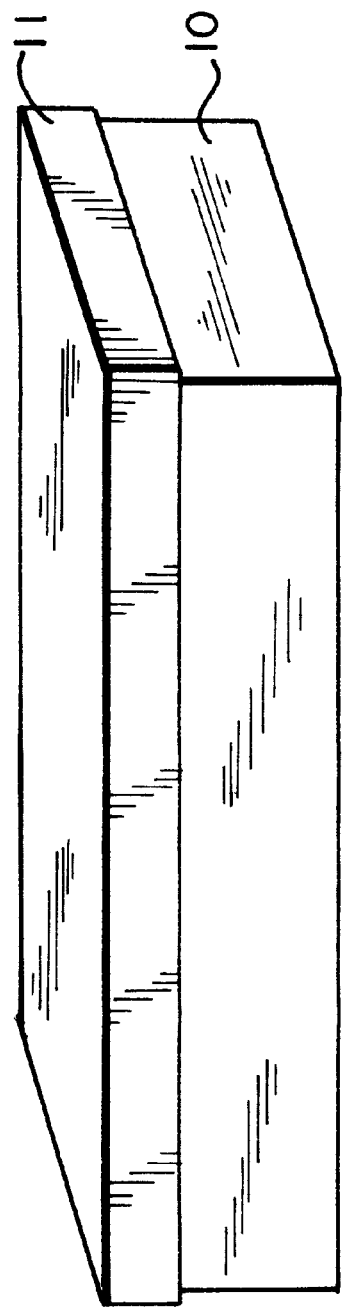

CAT LITTER MIXTURE AND PACKAGING FOR SAME

FIELD OF THE INVENTION

The present invention relates to a mixture of ingredients not based on clay granules, and it is combined with layers of newsprint to provide a cat litter.

BACKGROUND OF THE INVENTION

The standard cat litter is a heavy clay based granulated material. A second type of related material is also clay based but has a clumping characteristic when it is wetted. This latter type has powdery residue which often causes tracking as it attaches to the cat's paws and is then transferred to floor surfaces. Sometimes these cat litter materials are scented to attempt to mask cat box odor. These cat litter materials are usually packaged in a coated paper bag, although alternate packages such as disposable pans with litter captured in a paper sealed layer on the bottom are also available. The density of the material and the amount usually required for a single cat for a week present the problem of a heavy package for the typical supermarket shopper.

OBJECTS OF THE INVENTION

It is therefore an object of the invention to provide a cat litter that has greatly improved odor control.

A further object is to provide a cat litter that does not need to be cleaned every day.

Another object is to provide cat litter that is largely biodegradable and easy to dispose.

Yet another object is to provide a cat litter that is less dense and hence lighter to carry for an equivalent use period.

A further object is to limit the tracking and reduce mess in the use of cat litter.

Another object is to provide convenient packaging for this cat litter to reduce upkeep.

Yet another object is to provide an improved cat litter that costs no more than other cat litters.

SUMMARY OF THE INVENTION

A mixture of ingredients not based on clay granules, is combined with layers of newsprint to provide a cat litter with several advantages over the prior art. Convenient packaging options for the mixture are also presented.

DESCRIPTION OF THE DRAWINGS

The present invention can best be understood in connection with the accompanying drawings, in which:

FIGS. 2A and 2B show a disposable cardboard box package in isometric views, wherein:

FIG. 2A show the box closed;

FIG. 2B show the box open and ready for use;

FIGS. 3A and 3B show a disposable cat box liner package, wherein:

FIG. 3A is a side elevational view in cross section;

FIG. 3B is a top plan view thereof; and,

DETAILED DESCRIPTION OF THE DRAWINGS

The cat litter ingredients for a single cat box are assembled in a specific manner incorporating the use of four sheets of common newsprint. The main bulk of the mixture is composed of non-toxic biodegradable loose fill material such as ENVIROFILL®, a biodegradable polymer product of the Enpac Company of Wilmington, Del. This is a starch based material that uses water as a blowing agent; it is commonly used as a packaging material and may be disposed by rinsing down the sink as it dissolves in water. Also in the mixture is a small amount of talc, a powdered deodorant (preferably baking soda based), and filtered sand.

The amounts for a single cat litter box fill are as follows:

| Loose fill | 5 ounces | 16% by weight |
|---|---|---|
| Filtered sand | 1.5 pounds | 79.5% by weight |
| Powdered deodorant | 0.5 ounces | 1.5% by weight |
| Talc | 1 ounce | 3% by weight |

Figure 1:
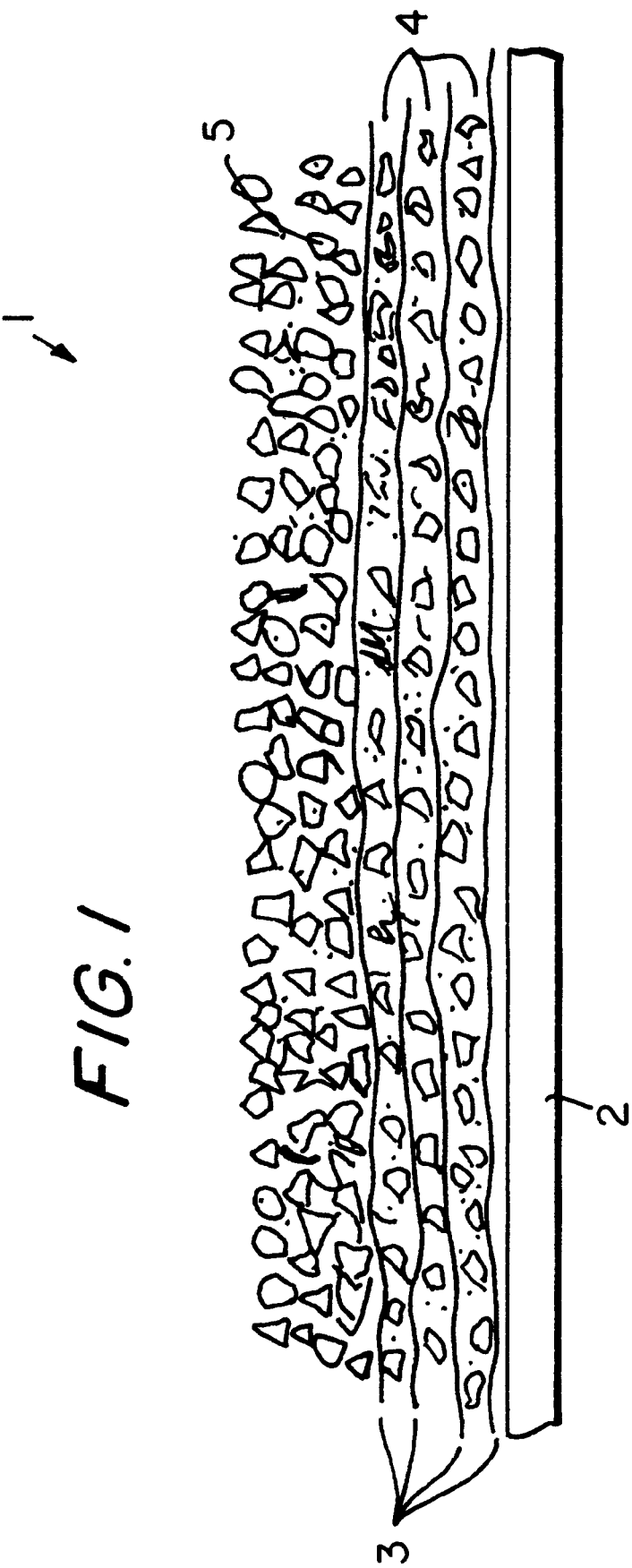
FIG. 1 is a side view showing layers of ingredients within a package.

FIG. 1 shows how the material 1 is layered in a cat box 2. The loose fill, filtered sand and talc are mixed together as mixture 5. A sheet of newsprint 3 is placed on the bottom of the cat litter box 2. Next, a small amount of mixture 5 is added and a third of the powdered deodorant is added; this is mixture 4. A second sheet of newsprint 3 is added, more mixture 4, another sheet of newsprint 3, more mixture 4 and finally the fourth sheet of newsprint 3. Then the remaining amount of mixture 5 is added on top. The sheets of newsprint may be attached to the bottom edge of the pan with adhesive to keep the deodorant in place between the layers.

FIGS. 2A and 2B show a biodegradable cat litter box made of corrugated cardboard. It has a box 10 with a lid 11 which can be stored under the box 10 when the box is in use as shown in view B. Mixture 5 can be seen inside. The box would be sold with the ingredients inside and the newsprint layers attached to the bottom edge of box 10. The entire box may be shrink wrapped to insure that the lid doesn't come off and spill the ingredients. It may be stored in any orientation, but the user should shake the box before opening. After use, the entire box is disposed; it should disintegrate in a land fill. The only ingredient that will not biodegrade is the small amount of sand.

Figure 3A:
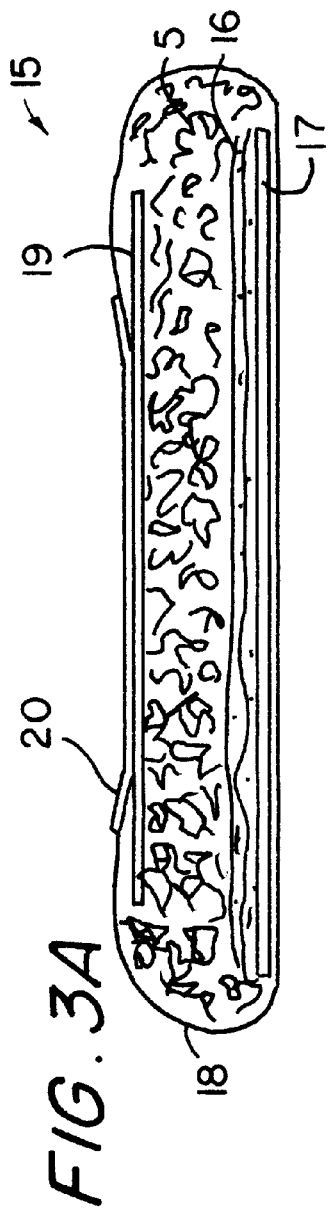
Figure 3B:
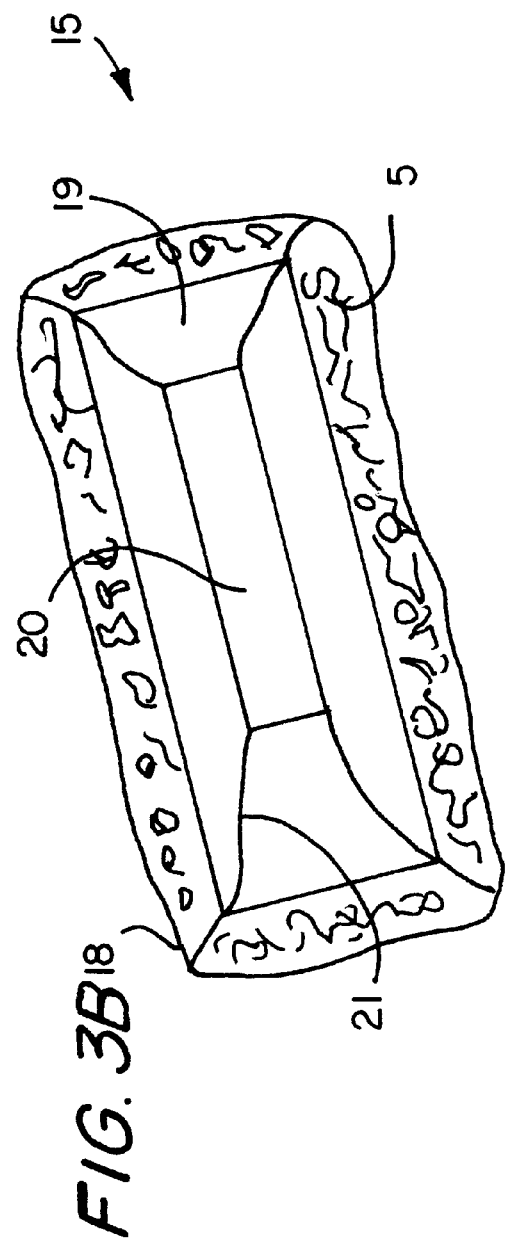

FIGS. 3A and 3B show a package of cat litter in a disposable litter box liner. Part A shows the package 15 in crossection. The plastic bag material 18 encloses the ingredients. A bottom layer of corrugated cardboard 17 forms a base. The four layers of newsprint with ingredients 4 within are shown as layer 16; these are adhesively attached to the edge of layer 17. The rest of the mixture 5 is enclosed by bag 18. A smaller and thinner removable cardboard layer 19 is used on top of the mixture 5 and forms a surface to attach the bag to seal the contents with tape layer 20. The corners of the bag are folded 21 as shows in view B. The user simply places the liner with ingredients 15 in a clean cat litter box with layer 17 on the bottom. Then tape 20 and top layer 19 are removed. The folded bag top is then folded over the edge of the litter pan; everything is then ready for use with no mess. After use, the bag is closed with a wire tie and disposed.

Figure 4:
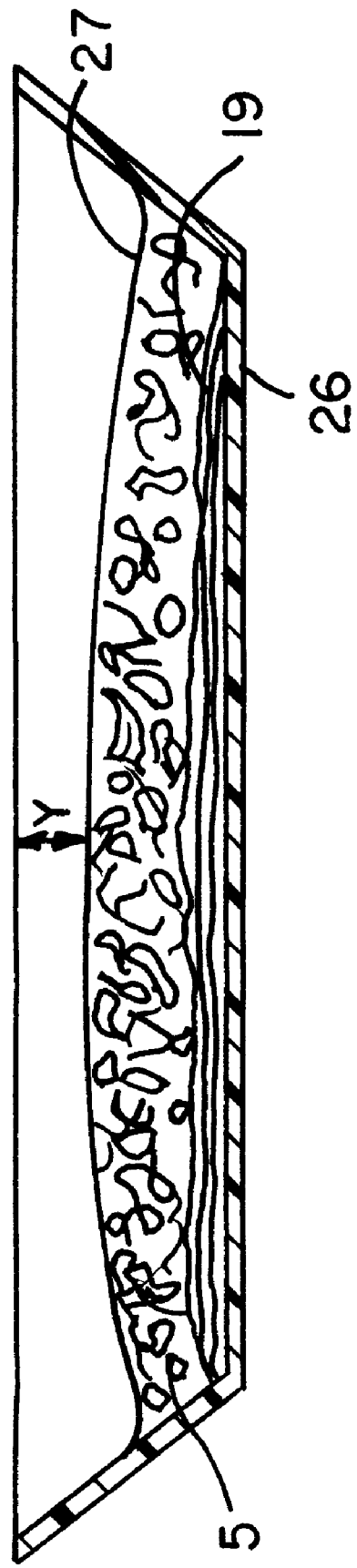
FIG. 4 is a disposable litter pan package shown in a side cross sectional view.

FIG. 4 shows a disposable molded plastic litter box 25 with the ingredients of this invention within. The pan 26 has sloping sides which permits partial nesting with other such pans thereby reducing store display space. They may be nested to a depth of "Y" as indicated in the figure. A heavy paper top layer 27 is adhesively attached to the inner edge of pan 26 to capture and partially compress mixture 5 as shown. The bottom newsprint layers 19 are attached to the pan 26 bottom edge.

Another packaging alternative is a simple paper bag such as is commonly used for cat litter. In such a case, the customer can supply his own newsprint for the bottom, and the deodorant can be supplied in a separate pouch or it can simply be mixed in with ingredients 5.

I claim:

1. A cat litter for a litter box comprising:

an aggregate mixture of 16% by weight of biodegrable loose fill corn polymer 3% by weight of talc, 1.5% by weight of a baby powder and baking soda-based deodorant, and 79.5% by weight of filtered sand.

2. The cat litter as in claim 1 wherein said biodegrable loose fill polymer is starch-based loosefill product.

3. A cat litter box and cat litter mixture assembly comprising:

a box, a first lower base layer of newsprint paper on a bottom of said box, a first layer of mixture of sand, biodegradable loose fill polymer, filtered sand, powdered baking soda-based deodorant and talc, a second intermediate sheet of newsprint placed above said first layer of mixture, a second layer of mixture of biodegradable loose fill polymer, filtered sand powdered baking soda-based deodorant and talc above said second intermediate sheet of newsprint, a third sheet of newsprint above said second layer of mixture, a further third layer of mixture of sand, biodegradable loose fill polymer, powdered baking soda-based deodorant and talc, a fourth sheet of newsprint, and a fourth upper layer of a mixture of biodegradable loose fill polymer filtered sand and talc.

4. The cat litter box and mixture as in claim 3, wherein said litter box is made of corrugated cardboard.

5. The cat litter box and mixture assembly as in claim 3, further comprising a disposable litter box liner.

6. A cat litter box and cat litter mixture assembly comprising:

a disposable box, a plurality of layers of a mixture of a biodegradable loose fill polymer, talc, powdered baking soda based deodorant and filtered sand, said layers of said mixture interspersed by layers of newsprint paper.

7. The cat litter box defined in claim 6 wherein said mixture includes about 16% by weight of said biodegradable loose fill polymer, about 3% by weight of talc, about 1.5% by weight of said powdered baking soda-based deodorant, and about 79.5% by weight of said filtered sand.

8. A cat litter for a disposable cat litter box comprising:

a plurality of layers of a mixture interspersed by layers of newsprint paper, each of the layers of the mixture including a biodegradable loose fill polymer, talc, powdered baking soda based deodorant, and filtered sand.

* * * * *